(12) United States Patent
Wattai et al.

(10) Patent No.: US 7,712,454 B2
(45) Date of Patent: May 11, 2010

(54) RESERVOIR-LESS FUEL DELIVERY MODULE HAVING CRIMP CONNECTION TO A FLANGE

(75) Inventors: John Patrick Wattai, Rochester Hills, MI (US); Brandon John Goll, Orion, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 52 days.

(21) Appl. No.: 12/219,670

(22) Filed: Jul. 25, 2008

(65) Prior Publication Data

US 2009/0025692 A1   Jan. 29, 2009

Related U.S. Application Data

(60) Provisional application No. 60/962,210, filed on Jul. 27, 2007.

(51) Int. Cl.
 *F02M 37/04* (2006.01)
 *F02M 37/08* (2006.01)
(52) U.S. Cl. .................................. 123/509
(58) Field of Classification Search ............ 123/509, 123/510, 511, 497; 417/363, 423.15, 424.2, 417/448
See application file for complete search history.

(56) References Cited

U.S. PATENT DOCUMENTS 3,335,641 A * 8/1967 Toschkoff .................. 92/100

FOREIGN PATENT DOCUMENTS

| DE | 19821229 A1 | 12/1998 |
| EP | 1310665 A | 5/2003 |
| WO | WO 99/09312 A | 2/1999 |

OTHER PUBLICATIONS

PCT Search Report & Written Opinion in PCT/US2008/009070 mailed Nov. 26, 2008.

* cited by examiner

*Primary Examiner*—Mahmoud Gimie

(57) ABSTRACT

A fuel delivery module (10) for a fuel tank of a vehicle includes a mounting flange (37) constructed and arranged to be mounted to an opening in a fuel tank of a vehicle. A pump and filter structure (20) is provided and includes a fuel pump (14) having an inlet and an outlet, and a fuel filter (22) surrounding at least a portion of the fuel pump for filtering fuel exiting the outlet of the pump. A crimp connection (27) couples the pump and filter structure to the flange. An electrical connector (34) is provided through the flange and is constructed and arranged so as not to be exposed to fluid pressure of the module. The electrical connector is electrically connected to the fuel pump. A fuel regulator (28) is coupled to the pump and filter structure.

20 Claims, 1 Drawing Sheet

RESERVOIR-LESS FUEL DELIVERY MODULE HAVING CRIMP CONNECTION TO A FLANGE

This application claims the benefit of the earlier filing date of U.S. Provisional Application No. 60/962,210, filed on Jul. 27, 2007, which is hereby incorporated by reference into this specification.

FIELD OF THE INVENTION

The invention relates to fuel delivery modules for vehicles and, more particularly, to a reservoir-less type fuel module wherein a fuel pump and filter structure of the module is mounted by a crimp connection to a flange.

BACKGROUND OF THE INVENTION

Fuel delivery modules of vehicles can include a fuel pump mounted in a reservoir within a fuel tank. The reservoir is kept supplied with fuel from the tank so that the pump can supply fuel to an engine under certain conditions such as, when the vehicle is on an incline and fuel would otherwise not be supplied to the pump.

A conventional reservoir-less fuel delivery module includes a steel flange constructed and arranged to be mounted to a fuel tank, a pump and filter structure having a filter surrounding a fuel pump, and a regulator associated with the fuel pump. A portion of the pump and filter structure is welded directly to the flange. This module has several disadvantages. The electrical connector for powering the pump is under system pressure and leakage can occur through the terminals. There may also be hydraulic leakage at a barb connection between the conductive regular housing and filter housing. There may be insufficient sealing between a dirty and a clean side of the filter cartridge. The filter housing is not grounded to the pump which may cause electrostatic discharge issues. Welding of a portion of the pump and filter structure to the flange increases cost due to the addition of another manufacturing process.

Thus, there is a need provide improved fuel delivery module for a reservoir-less type system that addresses the deficiencies of the conventional module noted above.

SUMMARY OF THE INVENTION

An object of the invention is to fulfill the need referred to above. In accordance with the principles of the disclosed embodiments, this objective is obtained by a fuel delivery module for a fuel tank of a vehicle. The module includes a mounting flange constructed and arranged to be mounted to an opening in a fuel tank of a vehicle. A pump and filter structure is provided and includes a fuel pump having an inlet and an outlet, and a fuel filter surrounding at least a portion of the fuel pump for filtering fuel exiting the outlet of the pump. A crimp connection couples the pump and filter structure to the flange. An electrical connector is provided through the flange and is constructed and arranged so as not to be exposed to fluid pressure of the module. The electrical connector is electrically connected to the fuel pump. A fuel regulator is coupled to the pump and filter structure.

In accordance with another aspect of the embodiment, a fuel delivery module for a fuel tank of a vehicle includes a pump and filter structure including a fuel pump having an inlet and an outlet, and means, surrounding at least a portion of the fuel pump, for filtering fuel exiting the outlet of the pump. Means for mounting the pump and filter structure with respect to an opening in a fuel tank of a vehicle is provided. A crimp connection couples the pump and filter structure to the means for mounting. An electrical connector is provided through the flange and is constructed and arranged so as not to be exposed to fluid pressure of the module. The electrical connector is electrically connected to the fuel pump. A fuel regulator is coupled to the pump and filter structure.

Other objects, features and characteristics of the present embodiments, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
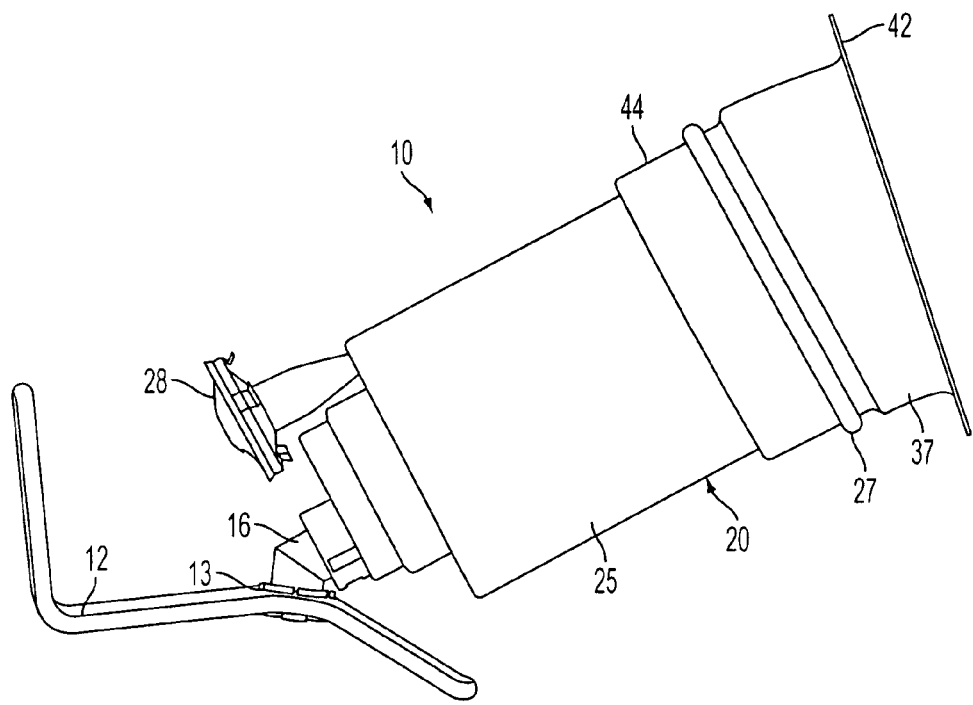
FIG. 1 is a side view of a fuel delivery module showing a portion of a fuel pump and filter structure coupled to a flange by a crimp connection.

With reference to FIG. 1, a reservoir-less fuel delivery module for a vehicle is shown, generally indicated at 10, in accordance with an embodiment of the present invention. The module 10 includes a tank bottom referencing pump filter 12 constructed and arranged to filter fuel prior to entering a fuel pump 14. The pump filter 12 is generally L-shaped having an opening 13 therein. An outlet 16 of the pump filter 12 communicates with an inlet 17 of the pump 14. The outlet 16 communicates with the opening 13 such that fuel may be drawn from the fuel tank, be pre-filtered by pump filter 12, and sent to the inlet 17 of the pump 14.

A pump and filter structure, generally indicated at 20, includes a housing 25 containing a filter 22 (FIG. 2) that surrounds a portion of the fuel pump 14 to filter fuel that exits the pump outlet 23 (FIG. 2), prior to being delivered to an engine (not shown) of the vehicle. The fuel pump 14 can be considered to be part of the pump and filter structure. Fuel flow is indicated by the arrows in FIG. 2. The pump outlet 23 is constructed and arranged to direct fuel in a direction generally transverse with respect to a longitudinal axis A of the pump 14.

Figure 2:
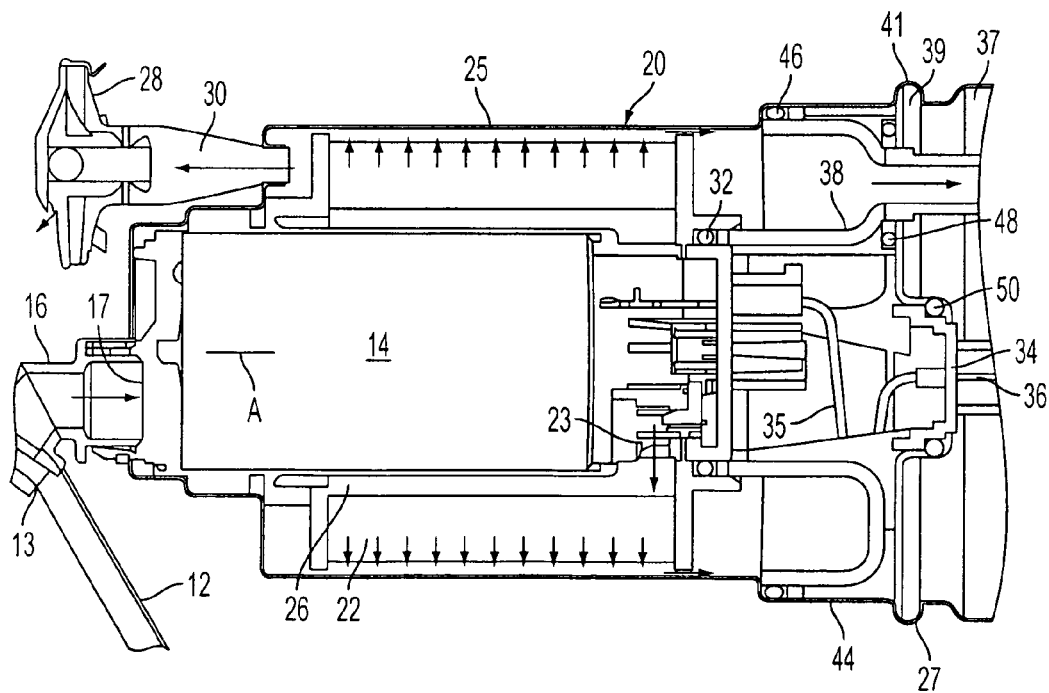
FIG. 2 is view of fluid flow through the pump of the module of FIG. 1.

As best seen in FIG. 2, the pump and filter structure 20 is coupled to a steel mounting flange 37 via a crimp connection 27. The flange 37 is constructed and arranged to mount to surfaces defining an opening in a fuel tank (not shown). In the embodiment, the crimp connection 27 includes an annular rim 39 defined by the flange 37 and a lip 41 of the pump and flange structure 20 disposed over the rim and crimped or engaged with the rim 39. Since the housing 25 of the pump and flange structure 20 is metal and the flange 37 is steel, the crimp connection 27 a metal to metal connection. Thus, no weld connection is needed to secure the pump and filter structure 20 to the flange 37.

With reference to FIGS. 1 and 2, the flange 37 has and end 42 constructed and arranged to be mounted to a wall of a fuel tank. In the embodiment, the module 10 is a side mounted module constructed and arranged such that the end 42 can be mounted to a sidewall of a fuel tank. It can be appreciated that the module 10 can be constructed and arranged such that the end 42 can be mounted to a top of a fuel tank.

As shown in FIG. 2, the housing 25 of the pump and filter structure 20 is generally cylindrical and houses the filter 22. The filter 22 has a central opening 26 that receives the generally cylindrical fuel pump 14 therein so that the filter 22 surrounds at least a portion of the pump 14.

A fuel regulator 28 having an electrically conductive steel housing 30 is directly connected to the pump and filter structure 20 since it is integrally brazed with the housing 25. Thus, due to this direct connection, hydraulic leakage between the regulator housing 30 and the structure 20 is prevented due to the elimination of the barbed connection that connects these housings in the conventional module. In addition, filtration efficiency is improved since a seal 32 seals the filter 22 to the outside diameter of the pump 14, from the dirty side of the filter to the clean side thereof.

As shown in FIG. 2, an electrical connector 34 is provided through the flange 37 with terminals 36 accessible on an outside of the flange 37 and thus accessible outside of the fuel tank. The connector 34 is electrically connected to the pump 14 via wires 35. The pump and filter structure 20 also defines a fuel delivery port 38 of the module 10 for delivering filter fuel through the flange 37 and thus out of the tank to an engine. A plastic cover 44 is provided between the housing 25 and the flange 37. A high pressure seal, such as and O-ring 46, is provided between the housing and the plastic cover 44. Low pressure seals 48 and 50 (e.g. O-rings) are provided between the flange 37 and plastic cover 44. Thus, the connector 34 is isolated from the fuel delivery port 38 and pump outlet 23 and is therefore not under the fluid pressure of the module 10. Hence, the connector 34 is more durable than the connector of the conventional module where leakage may occur through the terminals. The filter housing 24 is also grounded to the pump 14 to reduce electrostatic discharge issues.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A fuel delivery module for a fuel tank of a vehicle, the module comprising:
   a mounting flange constructed and arranged to be mounted to an opening in a fuel tank of a vehicle, the flange having an end larger than the opening and defining a surface constructed and arranged to engage a surface of the fuel tank that surrounds the opening,
   a pump and filter structure comprising:
      a fuel pump having an inlet and an outlet, and
      a fuel filter surrounding at least a portion of the fuel pump for filtering fuel exiting the outlet of the pump,
   a crimp connection coupling the pump and filter structure to the flange,
   an electrical connector through the flange constructed and arranged so as not to be exposed to fluid pressure of the module, the electrical connector being electrically connected to the fuel pump, and
   a fuel regulator external of but coupled to the pump and filter structure.

2. The module of claim 1, wherein a housing of the fuel regulator is directly coupled to a housing of the pump and filter structure absent a barbed connection.

3. The module of claim 2, wherein the housing of the fuel regulator is integrally brazed with the housing of the pump and filter structure.

4. The module of claim 1, wherein the pump is generally cylindrical and a seal seals the filter to an outside diameter of the pump from a dirty side of the filter to a clean side thereof.

5. The module of claim 1, wherein the flange is a steel flange.

6. The module of claim 1, wherein the outlet of the pump is constructed and arranged to direct fuel in a direction generally transverse with respect to a longitudinal axis of the pump.

7. The module of claim 1, wherein the crimp connection is defined by an annular rim protruding outwardly from a surface of the flange and a lip of the pump and filter structure engaged with the rim.

8. The module of claim 1, wherein a plastic flange is provided with seals between a housing of the pump and filter structure and the flange.

9. A fuel delivery module for a fuel tank of a vehicle, the module comprising:
   a pump and filter structure comprising:
      a fuel pump having an inlet and an outlet, and
      means, surrounding at least a portion of the fuel pump, for filtering fuel exiting the outlet of the pump,
   means for mounting the pump and filter structure with respect to an opening in a fuel tank of a vehicle, the means for mounting having an end larger than the opening and defining a surface constructed and arranged to engage a surface of the fuel tank that surrounds the opening,
   a crimp connection coupling the pump and filter structure to the means for mounting,
   an electrical connector through the flange constructed and arranged so as not to be exposed to fluid pressure of the module, the electrical connector being electrically connected to the fuel pump, and
   a fuel regulator external of but coupled to the pump and filter structure.

10. The module of claim 9, wherein a housing of the fuel regulator is directly coupled to a housing of the pump and filter structure absent a barbed connection.

11. The module of claim 10, wherein the housing of the fuel regulator is molded integrally with the housing of the pump and filter structure.

12. The module of claim 9, wherein the pump is generally cylindrical and a seal seals the means for filtering to an outside diameter of the pump from a dirty side of the means for filtering to a clean side thereof.

13. The module of claim 9, wherein the flange is a steel flange.

14. The module of claim 9, wherein the outlet of the pump is constructed and arranged to direct fuel in a direction generally transverse with respect to a longitudinal axis of the pump.

15. The module of claim 9, wherein the crimp connection is defined by an annular rim protruding outwardly from a surface of the means for mounting and a lip of the pump and filter structure engaged with the rim.

16. The module of claim 9, wherein a plastic flange is provided with seals between a housing of the pump and filter structure and the means for mounting.

17. The module of claim 9, wherein the fuel pump is generally cylindrical and the means for filtering has a central opening that receives at least a portion of the fuel pump.

18. A method of coupling a flange of a fuel delivery module to a pump and filter structure of the module, the method comprising:

providing the flange to include an annular rim and an end that is larger than an opening in a fuel tank, the end defining a surface constructed and arranged to engage a surface of the fuel tank that surrounds the opening to mount the flange to the fuel tank;

providing a housing of the pump and filter structure to include a lip, and crimping the lip to the annular rim, wherein the flange is steel and the housing of the pump and filter structure is metal.

19. The module of claim 1, wherein the fuel pump is generally cylindrical and the fuel filter has a central opening that receives at least a portion of the fuel pump.

20. The method of claim 18, wherein the annular rim protrudes outwardly from a surface of the flange.

* * * * *